(12) United States Patent
Su

(10) Patent No.: US 8,793,870 B2
(45) Date of Patent: Aug. 5, 2014

(54) COMPRESSOR HAVING SHELL WITH ALIGNMENT FEATURES

(75) Inventor: Xiaogeng Su, Suzhou (CN)

(73) Assignee: Emerson Climate Technologies, Inc., Sidney, OH (US)

( * ) Notice: Subject to any disclaimer, the term of this patent is extended or adjusted under 35 U.S.C. 154(b) by 411 days.

(21) Appl. No.: 13/034,803

(22) Filed: Feb. 25, 2011

(65) Prior Publication Data

US 2011/0146073 A1 Jun. 23, 2011

Related U.S. Application Data

(63) Continuation of application No. 12/207,036, filed on Sep. 9, 2008, now Pat. No. 7,914,268.

(60) Provisional application No. 60/993,465, filed on Sep. 11, 2007, provisional application No. 60/993,452, filed on Sep. 11, 2007, provisional application No. 60/993,464, filed on Sep. 11, 2007, provisional application No. 60/993,451, filed on Sep. 11, 2007, provisional application No. 61/038,162, filed on Mar. 20, 2008.

(51) Int. Cl.
*F16C 33/00* (2006.01)

(52) U.S. Cl.
USPC ............ 29/888.02; 29/888; 418/55.1

(58) Field of Classification Search
USPC ........... 29/88.02, 888.022–888.024, 888, 29/888.3; 418/55.1–55.6; 72/367.1, 368
See application file for complete search history.

(56) References Cited

U.S. PATENT DOCUMENTS

| | | | |
|---|---|---|---|
| 4,431,388 A | 2/1984 | Eber et al. | |
| 4,674,542 A * | 6/1987 | Baillet | 138/148 |
| 4,846,633 A | 7/1989 | Suzuki et al. | |
| 4,877,382 A | 10/1989 | Caillat et al. | |
| 4,911,620 A | 3/1990 | Richardson, Jr. et al. | |
| 5,080,566 A | 1/1992 | Sakata et al. | |
| 5,102,316 A | 4/1992 | Caillat et al. | |
| 5,188,520 A | 2/1993 | Nakamura et al. | |
| 5,215,451 A | 6/1993 | Hara et al. | |

(Continued)

FOREIGN PATENT DOCUMENTS

| | | |
|---|---|---|
| CN | 1103932 | 6/1995 |
| CN | 1196776 | 10/1998 |

(Continued)

OTHER PUBLICATIONS

International Search Report regarding International Application No. PCT/US2008/010622 dated Feb. 24, 2009.

(Continued)

*Primary Examiner* — Christopher Besler
(74) *Attorney, Agent, or Firm* — Harness, Dickey & Pierce, P.L.C.

(57) ABSTRACT

A method includes forming a sheet of material having first, second, third, and fourth ends. The third and fourth ends extend longitudinally between the first and second ends. First and second protrusions are formed at the first end. The first and second protrusions extend longitudinally outwardly from an edge of the first end. The third and fourth ends are coupled to one another to create a longitudinally extending compressor shell having a stepped region at the edge of the first end where the third and fourth ends meet.

20 Claims, 5 Drawing Sheets

(56) References Cited

U.S. PATENT DOCUMENTS

| | | | |
|---|---|---|---|
| 5,216,811 A * | 6/1993 | Jackson et al. | 29/898.056 |
| 5,241,495 A | 8/1993 | Sasaki | |
| 5,280,230 A | 1/1994 | Mahoney | |
| 5,281,114 A | 1/1994 | Bush | |
| 5,336,058 A | 8/1994 | Yokoyama | |
| 5,407,335 A | 4/1995 | Caillat et al. | |
| 5,411,384 A | 5/1995 | Bass et al. | |
| 5,447,418 A | 9/1995 | Takeda et al. | |
| 5,451,148 A | 9/1995 | Matsuzaki et al. | |
| 5,462,418 A | 10/1995 | Shimizu et al. | |
| 5,470,213 A | 11/1995 | Iguchi et al. | |
| 5,478,223 A | 12/1995 | Yamamoto et al. | |
| 5,487,653 A | 1/1996 | Lee | |
| 5,511,959 A | 4/1996 | Tojo et al. | |
| 5,527,166 A | 6/1996 | Chang et al. | |
| 5,580,230 A * | 12/1996 | Keifer et al. | 418/55.5 |
| 5,683,236 A | 11/1997 | Harrison et al. | |
| 5,863,191 A | 1/1999 | Motegi et al. | |
| 5,897,306 A | 4/1999 | Beck | |
| 5,921,761 A | 7/1999 | Eckels | |
| 6,017,203 A | 1/2000 | Sugawa et al. | |
| 6,056,524 A | 5/2000 | Williams et al. | |
| 6,095,764 A | 8/2000 | Shibamoto et al. | |
| 6,113,373 A | 9/2000 | Fukuhara et al. | |
| 6,132,191 A | 10/2000 | Hugenroth et al. | |
| 6,142,754 A | 11/2000 | Hsiao et al. | |
| 6,193,485 B1 | 2/2001 | Ueda et al. | |
| 6,241,495 B1 | 6/2001 | Chang | |
| 6,307,356 B1 | 10/2001 | Dwelley | |
| 6,419,457 B1 | 7/2002 | Seibel et al. | |
| 6,494,688 B1 | 12/2002 | Barito et al. | |
| 6,537,044 B2 | 3/2003 | Chang et al. | |
| 6,679,683 B2 | 1/2004 | Seibel et al. | |
| 6,821,092 B1 * | 11/2004 | Gehret et al. | 417/213 |
| 6,884,046 B2 | 4/2005 | Matsukawa et al. | |
| 6,896,497 B2 | 5/2005 | Kuo | |
| 6,953,330 B1 | 10/2005 | Muto | |
| 6,984,115 B1 | 1/2006 | Tarng et al. | |
| 7,074,013 B2 | 7/2006 | Seibel et al. | |
| 7,140,851 B2 | 11/2006 | Tarng | |
| 7,300,265 B2 | 11/2007 | Stover | |
| 7,553,140 B2 | 6/2009 | Stover | |
| 7,914,268 B2 | 3/2011 | Su | |
| 2005/0201883 A1 | 9/2005 | Clendenin et al. | |
| 2006/0198748 A1 | 9/2006 | Grassbaugh et al. | |
| 2006/0204379 A1 | 9/2006 | Seibel et al. | |
| 2006/0204380 A1 | 9/2006 | Seibel et al. | |
| 2006/0245968 A1 | 11/2006 | Gopinathan et al. | |
| 2007/0059192 A1 | 3/2007 | Stover | |
| 2007/0134117 A1 | 6/2007 | Liang et al. | |

FOREIGN PATENT DOCUMENTS

| | | |
|---|---|---|
| CN | 1197892 | 11/1998 |
| CN | 1349053 | 5/2002 |
| JP | 62225793 | 10/1987 |
| JP | 63173884 | 7/1988 |
| JP | 63239391 | 10/1988 |
| JP | 1130082 | 5/1989 |
| JP | 5180175 | 7/1993 |
| JP | 6140473 | 5/1994 |
| JP | 6307356 | 11/1994 |
| JP | 07027063 | 1/1995 |
| JP | 07063173 | 3/1995 |
| JP | 08261176 | 10/1996 |
| JP | 09317667 | 12/1997 |
| JP | 11022660 | 1/1999 |
| JP | 11182462 | 7/1999 |
| JP | 2001082354 | 3/2001 |
| JP | 2003065255 | 3/2003 |
| KR | 1019950006252 | 3/1995 |
| KR | 100186867 | 12/1998 |
| KR | 1019990060803 | 7/1999 |
| KR | 1020010035761 | 5/2001 |
| KR | 1020020030018 | 4/2002 |
| KR | 1020050008475 | 1/2005 |
| KR | 1020070030111 | 3/2007 |

OTHER PUBLICATIONS

Written Opinion of the International Searching Authority regarding International Application No. PCT/US2008/010622 dated Feb. 24, 2009.
International Search Report regarding International Application No. PCT/US2008/010623 dated Feb. 26, 2009.
Written Opinion of the International Searching Authority regarding International Application No. PCT/US2008/010623 dated Feb. 26, 2009.
International Search Report regarding International Application No. PCT/US2008/010597 dated Feb. 19, 2009.
Written Opinion of the International Searching Authority regarding International Application No. PCT/US2008/010597 dated Feb. 19, 2009.
International Preliminary Report on Patentability regarding International Application No. PCT/US2008/010597 dated Mar. 16, 2010.
International Preliminary Report on Patentability (Chapter II) regarding PCT/US2008/010624, mailed Jan. 18, 2010.
Declaration of Non-Establishment of International Search Report regarding PCT/US2008/010624, dated Apr. 24, 2009.
Written Opinion of the International Searching Authority regarding PCT/US2008/010624, dated Apr. 24, 2009.
International Search Report regarding International Application No. PCT/US2008/010604 dated Feb. 24, 2009.
Written Opinion regarding International Application No. PCT/US2008/010604 dated Feb. 24,2009.
International Preliminary Report on Patentability regarding International Application No. PCT/US2008/010622 dated Mar. 16, 2010.
International Preliminary Report on Patentability regarding International Application No. PCT/US2008/010604 dated Mar. 16, 2010.
International Preliminary Report on Patentability regarding International Application No. PCT/US2008/010623 dated Mar. 16, 2010.
Second Office Action from the State Intellectual Property Office for People's Republic of China regarding Chinese Patent Application No. 200880106347.7, dated Aug. 30, 2012. Translation provided by Unitalen Attorneys at Law.
First Chinese Office Action regarding Application No. 200880106327.X, dated Nov. 10, 2011. Translation provided by Unitalen Attorneys at Law.
U.S. Office Action regarding U.S. Appl. No. 12/207,072, dated Feb. 4, 2011.
U.S. Office Action regarding U.S. Appl. No. 12/207,072, mailed Jul. 13, 2011.
U.S. Office Action regarding U.S. Appl. No. 12/207,072, mailed Feb. 17, 2012.
U.S. Final Office Action regarding U.S. Appl. No. 12/207,072, mailed Jul. 2, 2012.
U.S. Notice of Allowance regarding U.S. Appl. No. 12/207,072, mailed Aug. 22, 2012.
First Chinese Office Action regarding Application No. 200880115902.2, dated Dec. 1, 2011. Translation provided by Unitalen Attorneys at Law.
Second Chinese Office Action regarding Application No. 200880115902.2, dated May 15, 2012. Translation provided by Unitalen Attorneys at Law.
First Chinese Office Action regarding Application No. 200880106340.5, dated Feb. 24, 2012. Partial translation provided by Unitalen Attorneys at Law.
U.S. Office Action regarding U.S. Appl. No. 12/207,051, mailed Feb. 9, 2011.
U.S. Notice of Allowance regarding U.S. Appl. No. 12/207,051, mailed Jul. 15, 2011.
U.S. Notice of Allowance regarding U.S. Appl. No. 12/207,036, mailed Dec. 9, 2010.
First Chinese Office Action regarding Application No. 200880106311.9, dated Dec. 9, 2011. Summary provided by Unitalen Attorneys at Law.

(56) References Cited

OTHER PUBLICATIONS

U.S. Office Action regarding U.S. Appl. No. 12/207,016, mailed Jan. 31, 2011.
U.S. Notice of Allowance regarding U.S. Appl. No. 12/207,016, mailed Jul. 11, 2011.
First Chinese Office Action regarding Application No. 200880106347.7, dated Dec. 13, 2011. Translation provided by Unitalen Attorneys at Law.
U.S. Notice of Allowance regarding U.S. Appl. No. 12/207,089, mailed Feb. 3, 2011.

* cited by examiner

COMPRESSOR HAVING SHELL WITH ALIGNMENT FEATURES

CROSS-REFERENCE TO RELATED APPLICATIONS

This application is a continuation of U.S. patent application Ser. No. 12/207,036 filed on Sep. 9, 2008 which claims the benefit of U.S. Provisional Application Nos. 60/993,451, 60/993,452, 60/993,464 and 60/993,465, each filed on Sep. 11, 2007 and U.S. Provisional Application No. 61/038,162, filed Mar. 20, 2008. The entire disclosures of each of the above applications are incorporated herein by reference.

FIELD

The present disclosure relates to compressors, and more specifically to compressor shell design and assembly.

BACKGROUND

This section provides background information related to the present disclosure which is not necessarily prior art.

A compressor may include a shell formed from a sheet of material. When assembled, the sheet of material may be rolled and first and second ends may be fixed relative to one another to form a cylindrical body. However, during the assembly process, a misalignment may occur between the first and second ends. This misalignment may produce a stepped region at the ends of the cylindrical body. When a partition is coupled to one of the ends, the stepped region may produce an angular offset between the partition and a longitudinal axis of the cylindrical body.

SUMMARY

This section provides a general summary of the disclosure, and is not a comprehensive disclosure of its full scope or all of its features.

A method includes forming a sheet of material having first, second, third, and fourth ends. The third and fourth ends extend longitudinally between the first and second ends. First and second protrusions are formed at the first end. The first and second protrusions extend longitudinally outwardly from an edge of the first end. The third and fourth ends are coupled to one another to create a longitudinally extending compressor shell having a stepped region at the edge of the first end where the third and fourth ends meet.

The first protrusion is formed to have a longitudinal extent that is greater than a longitudinal extent of the stepped region. First and second recesses are formed at the first end to create the edge at the first end having the first protrusion extending therefrom. The sheet of material is rolled to form a generally cylindrical compressor shell. The coupling includes welding the third and fourth ends to one another. A partition plate is located on the first protrusion and the partition plate is fixed to the shell.

Forming the first protrusion includes forming the first protrusion at a location spaced a distance from the third end between 1/12 and 1/2 the distance between the third and fourth ends. Forming the second protrusion includes forming the second protrusion at a location spaced a distance from the third end between 1/2 and 11/12 the distance between the third and fourth ends. A third protrusion is formed and extends longitudinally outwardly from the edge of the first end. Forming the third protrusion includes forming the third protrusion at a location between the first and second protrusions. A fourth protrusion is formed and extends longitudinally outwardly from the edge of the first end.

The method may further include locating a bearing housing within the compressor shell. A partition plate may be located on the first and second protrusions and fixed to the compressor shell. The first and second protrusions may locate the partition plate longitudinally relative to the bearing housing. Locating the partition plate on the first and second protrusions may mitigate an angular disposition of the partition plate relative to a thrust surface of the bearing housing.

An alternate method includes securing a bearing housing within a longitudinally extending compressor shell. The compressor shell may be formed from a sheet of material having first, second, third, and fourth ends. The third and fourth ends may be coupled to one another and may extend longitudinally between the first and second ends. The first end may include first and second protrusions extending longitudinally outwardly from an edge of the first end. A stepped region may be formed at the edge of the first end where the third and fourth ends meet. A partition plate may be located on the first and second protrusions to locate the partition plate longitudinally relative to the bearing housing. The partition plate may be fixed to the compressor shell.

Locating the partition plate on the first and second protrusions may mitigate an angular disposition of the partition plate relative to a thrust surface of the bearing housing.

The first protrusion may be spaced a distance from the third end in a first direction along the edge between 1/12 and 1/2 the distance between the third and fourth ends. The second protrusion may be spaced a distance from the third end in the first direction along the edge between 1/2 and 11/12 the distance between the third and fourth ends.

The compressor shell may include a third protrusion extending longitudinally outwardly from the edge of the first end. Locating the partition plate may include the partition plate being located on the third protrusion. The third protrusion may be located between the first and second protrusions. The compressor shell may include a fourth protrusion extending longitudinally outwardly from the edge of the first end. Locating the partition plate may include the partition plate being located on the fourth protrusion.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings are suitable for incorporation in many different types of scroll and rotary compressors, including hermetic machines, open drive machines and non-hermetic machines. For exemplary purposes, a compressor 10 is shown as a hermetic scroll refrigerant-compressor of the low-side type, i.e., where the motor and compressor are cooled by suction gas in the hermetic shell, as illustrated in the vertical section shown in FIG. 1.

Figure 1:
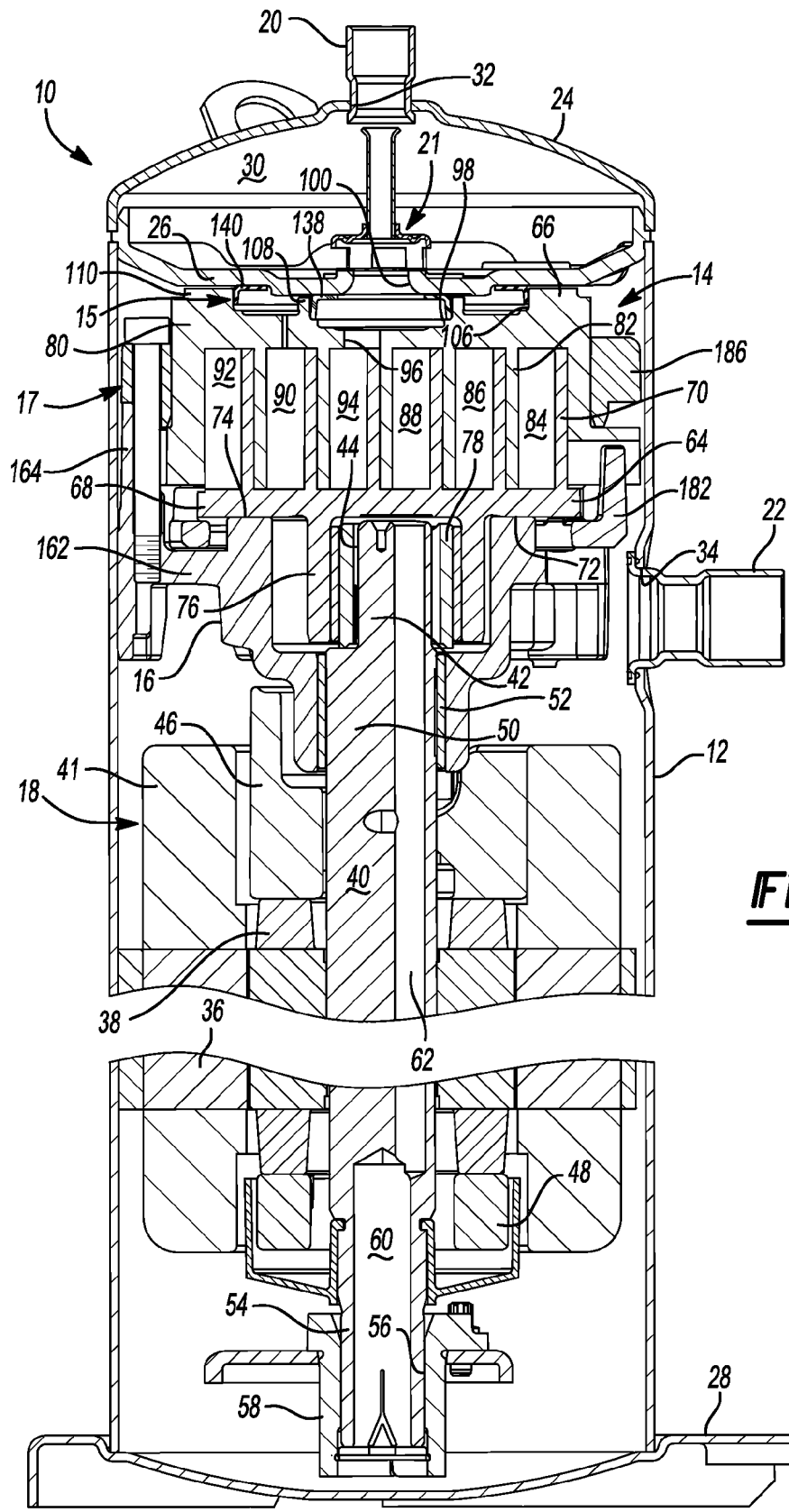
FIG. 1 is a sectional view of a compressor according to the present disclosure.

With reference to FIG. 1, compressor 10 may include a cylindrical hermetic shell 12, a compression mechanism 14, a seal assembly 15, a main bearing housing 16, a retaining assembly 17, a motor assembly 18, a refrigerant discharge fitting 20, a discharge valve assembly 21, and a suction gas inlet fitting 22. Hermetic shell 12 may house compression mechanism 14, main bearing housing 16, and motor assembly 18. Shell 12 may include an end cap 24 at the upper end thereof, a transversely extending partition 26, and a base 28 at a lower end thereof. End cap 24 and transversely extending partition 26 may generally define a discharge chamber 30. Discharge chamber 30 may generally form a discharge muffler for compressor 10. Refrigerant discharge fitting 20 may be attached to shell 12 at opening 32 in end cap 24. Suction gas inlet fitting 22 may be attached to shell 12 at opening 34. Compression mechanism 14 may be driven by motor assembly 18 and supported by main bearing housing 16. Main bearing housing 16 may be affixed to shell 12 at a plurality of points in any desirable manner, such as staking.

Motor assembly 18 may generally include a motor stator 36, a rotor 38, and a drive shaft 40. Windings 41 may pass through stator 36. Motor stator 36 may be press fit into shell 12. Drive shaft 40 may be rotatably driven by rotor 38. Rotor 38 may be press fit on drive shaft 40.

Drive shaft 40 may include an eccentric crank pin 42 having a flat 44 thereon and upper and lower counter-weights 46, 48. Drive shaft 40 may include a first journal portion 50 rotatably journaled in a first bearing 52 in main bearing housing 16 and a second journal portion 54 rotatably journaled in a second bearing 56 in lower bearing housing 58. Drive shaft 40 may include an oil-pumping concentric bore 60 at a lower end. Concentric bore 60 may communicate with a radially outwardly inclined and relatively smaller diameter bore 62 extending to the upper end of drive shaft 40. The lower interior portion of shell 12 may be filled with lubricating oil. Concentric bore 60 may provide pump action in conjunction with bore 62 to distribute lubricating fluid to various portions of compressor 10.

Compression mechanism 14 may generally include an orbiting scroll 64 and a non-orbiting scroll 66. Orbiting scroll 64 may include an end plate 68 having a spiral vane or wrap 70 on the upper surface thereof and an annular flat thrust surface 72 on the lower surface. Thrust surface 72 may interface with an annular flat thrust bearing surface 74 on an upper surface of main bearing housing 16. A cylindrical hub 76 may project downwardly from thrust surface 72 and may have a drive bushing 78 rotatively disposed therein. Drive bushing 78 may include an inner bore in which crank pin 42 is drivingly disposed. Crank pin flat 44 may drivingly engage a flat surface in a portion of the inner bore of drive bushing 78 to provide a radially compliant driving arrangement.

Non-orbiting scroll 66 may include an end plate 80 having a spiral wrap 82 on a lower surface thereof. Spiral wrap 82 may form a meshing engagement with wrap 70 of orbiting scroll 64, thereby creating an inlet pocket 84, intermediate pockets 86, 88, 90, 92, and an outlet pocket 94. Non-orbiting scroll 66 may be axially displaceable relative to main bearing housing 16, shell 12, and orbiting scroll 64. Non-orbiting scroll 66 may include a discharge passageway 96 in communication with outlet pocket 94 and upwardly open recess 98 which may be in fluid communication with discharge chamber 30 via an opening 100 in partition 26.

Non-orbiting scroll 66 may include an annular recess 106 in the upper surface thereof defined by parallel coaxial inner and outer side walls 108, 110. Annular recess 106 may provide for axial biasing of non-orbiting scroll 66 relative to orbiting scroll 64, as discussed below. More specifically, a passage 112 may extend through end plate 80 of non-orbiting scroll 66, placing recess 106 in fluid communication with intermediate pocket 90. While passage 112 is shown extending into intermediate pocket 90, it is understood that passage 112 may alternatively be placed in communication with any of the other intermediate pockets 86, 88, 92.

Seal assembly 15 may include first and second seals 138, 140. First and second seals 138, 140 may each include an L-shaped cross-section and may sealingly engage partition 26, as described in "Compressor Sealing Arrangement", filed Sep. 9, 2008, U.S. application Ser. No. 12/207,051, the disclosure of which is incorporated herein by reference. Discharge valve assembly 21 may generally prevent a reverse flow of fluid during compressor shut-down, as described in "Compressor Having a Shutdown Valve", filed Sep. 9, 2008, U.S. application Ser. No. 12/207,089, the disclosure of which is incorporated herein by reference.

Orbiting scroll 64 and non-orbiting scroll 66 may generally be supported by main bearing housing 16. Main bearing housing 16 may include a radially extending body portion 162 defining thrust bearing surface 74 and a plurality of arms 164 (one of which is shown) extending axially upwardly therefrom. Main bearing housing 16 may be pressed into shell 12 and staked thereto to fix main bearing housing 16 relative to shell 12.

Retaining assembly 17 may include an Oldham coupling 182 and a retaining ring 186, as described in "Compressor With Retaining Mechanism", filed Sep. 9, 2008, U.S. application Ser. No. 12/207,072, the disclosure of which is incorporated herein by reference. Oldham coupling 182 may be engaged with orbiting and non-orbiting scrolls 64, 66 to prevent relative rotation therebetween. Retaining ring 186 may limit axial displacement of non-orbiting scroll 66 relative to main bearing housing 16.

Figure 2:
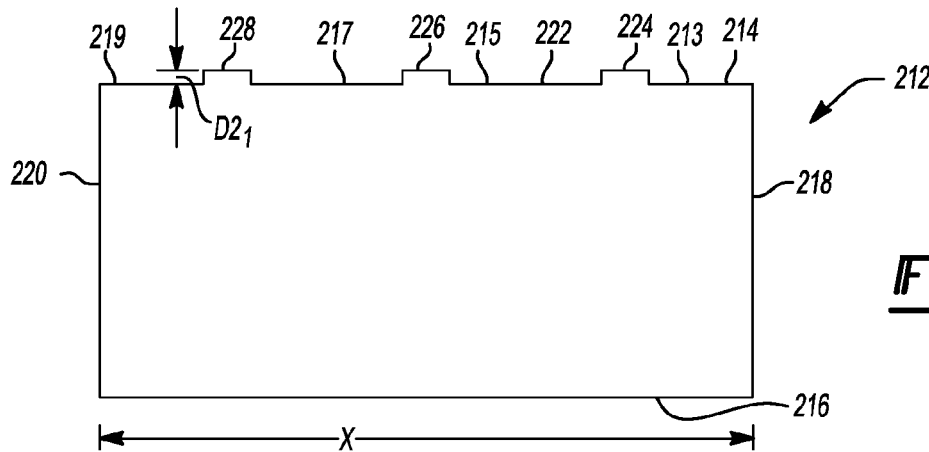
FIG. 2 is a schematic plan view of a sheet of material used to form the shell of the compressor of FIG. 1.
Figure 3:
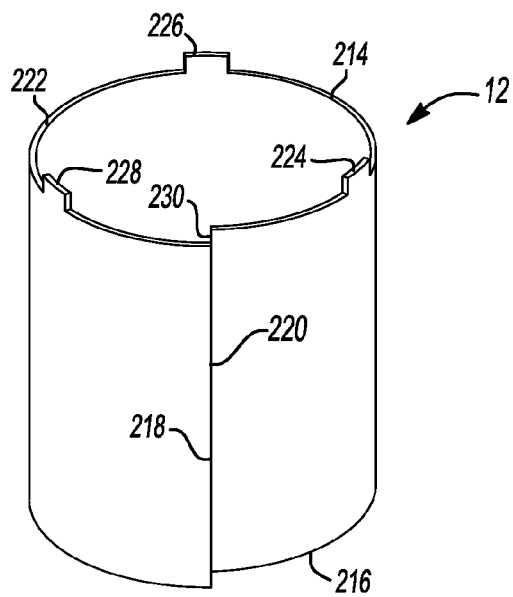
FIG. 3 is a schematic perspective view of the shell of FIG. 1.
Figure 4:
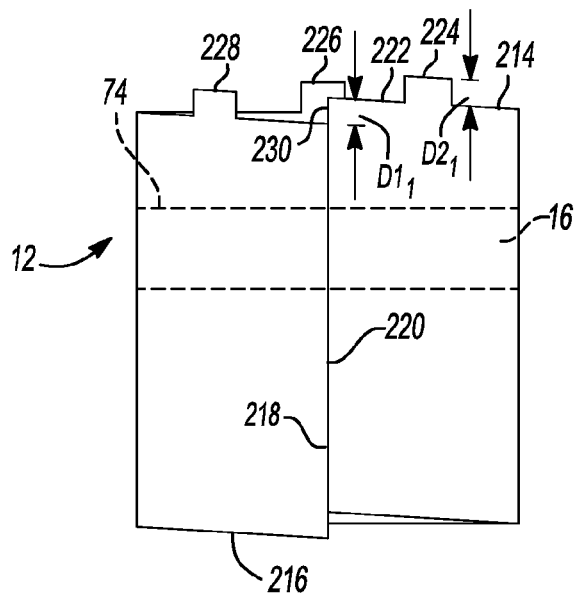
FIG. 4 is a schematic side plan view of the shell of FIG. 1.

With reference to FIGS. 2-6, shell 12 is schematically illustrated. Shell 12 may be formed from a metal sheet 212 (FIG. 2). Sheet 212 may be generally rectangular in shape, having first, second, third, and fourth ends 214, 216, 218, 220. First end 214 may define an edge 222 having first, second, and third protrusions 224, 226, 228 extending longitudinally therefrom. First, second, and third protrusions 224, 226, 228 may be integrally formed on sheet 212. First, second, and third protrusions 224, 226, 228 may be formed in a variety of ways including forming a series of recesses 213, 215, 217, 219 in first end 214 to create edge 222 and protrusions 224, 226, 228 extending therefrom. As such, protrusions 224, 226, 228 may be integrally formed on sheet 212.

Third and fourth ends 218, 220 may be spaced a distance (X) apart from one another (FIG. 2). Sheet 212 may be rolled and third and fourth ends 218, 220 may be coupled to one another to form cylindrical hermetic shell 12. A misalignment between third and fourth ends 218, 220 may result in a stepped region 230 being formed at first edge 222 where third and fourth ends 218, 220 meet. More specifically, third end 218 may extend a longitudinal distance ($D1_1$) outwardly relative to a portion of edge 222 at fourth end 220. First, second, and third protrusions 224, 226, 228 may each extend longitudinally outwardly a second distance ($D2_1$) from edge 222. Second distance ($D2_1$) may be greater than first distance ($D1_1$). First, second, and third protrusions 224, 226, 228 may be circumferentially disposed about first end 214. For example, first distance ($D1_1$) may be less than or equal to 0.2 mm. Second distance ($D2_1$) may be greater than 0.25 mm, and move specifically between 0.25 mm and 0.5 mm.

Figure 5:
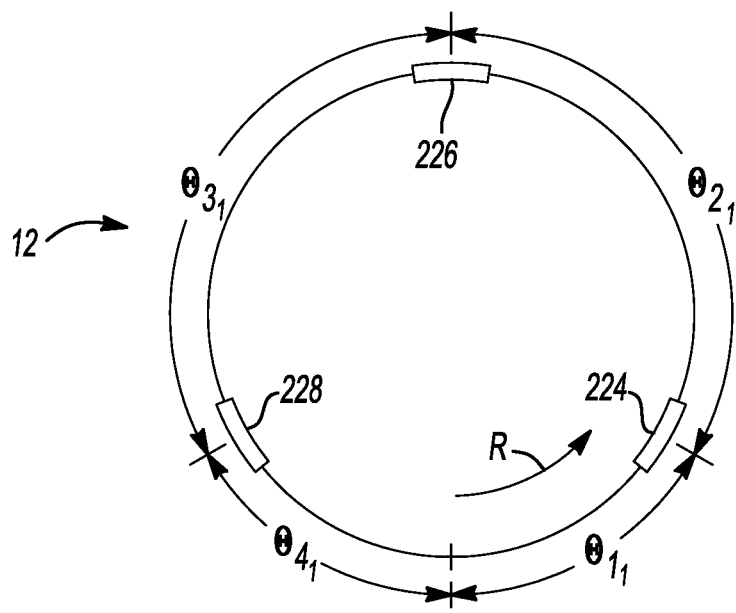
FIG. 5 is a schematic top plan view of the shell of FIG. 1.

As seen in FIG. 5, first protrusion 224 may be rotationally spaced by a first angle ($\theta1_1$) from third end 218 between 30 and 90 degrees in a rotational direction (R). Accordingly, first protrusion 224 may be spaced a distance of between 1/12 and 1/4 of distance (X) from third end 218. Second protrusion 226 may be rotationally spaced by a second angle ($\theta2_1$) from first protrusion 224. Second protrusion 226 may be rotationally spaced from third end 218 by an angle ($\theta1_1+\theta2_1$) between 150 and 210 degrees in rotational direction (R). Accordingly, second protrusion 226 may be spaced a distance of between 5/12 and 7/12 of distance (X) from third end 218. More specifically, second protrusion 226 may be located generally opposite to third end 218, or approximately 1/2 of distance (X) from third end 218. Third protrusion 228 may be rotationally spaced from second protrusion 226 by a third angle ($\theta3_1$). Third protrusion 228 may be rotationally spaced from third end 218 by an angle ($\theta1_1+\theta2_1+\theta3_1$) between 270 and 330 degrees in rotational direction (R). Accordingly, third protrusion 228 may be spaced a distance of between 3/4 and 11/12 of distance (X) from third end 218. First protrusion 224 may be rotationally spaced from third protrusion 228 by an angle ($\theta1_1+\theta4_1$) between 90 and 180 degrees in rotational direction (R). More specifically, the angle between first and third protrusions 224, 228 may be between 120 and 180 degrees.

Figure 6:
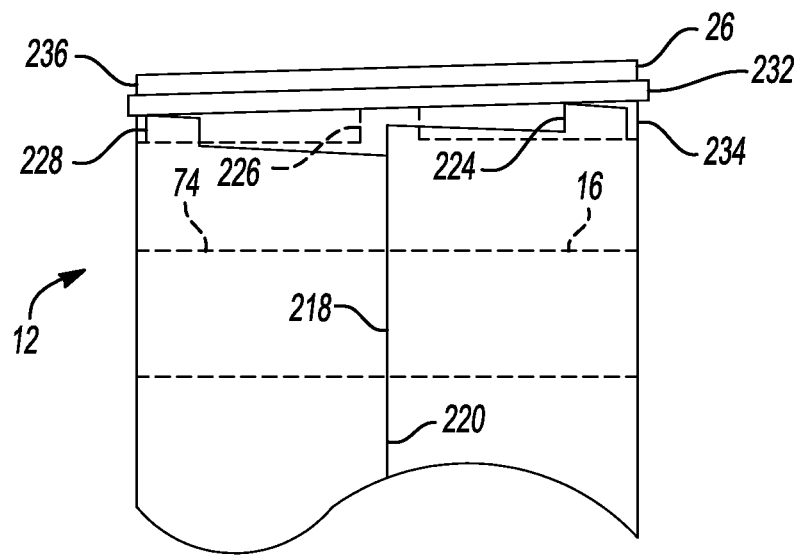
FIG. 6 is a schematic plan view of the shell and partition of FIG. 1.

Engagement between shell 12 and partition 26 is schematically illustrated in FIG. 6. Partition 26 may generally abut first, second, and third protrusions 224, 226, 228 to longitudinally locate partition 26 relative to main bearing housing 16 and more specifically, relative to thrust bearing surface 74. Partition 26 may include a central portion 232 having first and second portions 234, 236 extending longitudinally therefrom. First portion 234 may extend longitudinally into shell 12 and second portion 236 may extend longitudinally outwardly relative to shell 12 for engagement with end cap 24. Central portion 232 may extend laterally outwardly and abut first, second, and third protrusions 224, 226, 228, locating partition 26 relative thereto. Engagement between partition 26 and first, second, and third protrusions 224, 226, 228 may generally mitigate an angular disposition of partition 26 relative to thrust bearing surface 74 of main bearing housing 16 resulting from the misalignment between third and fourth ends 218, 220 of sheet 212.

Figure 7:
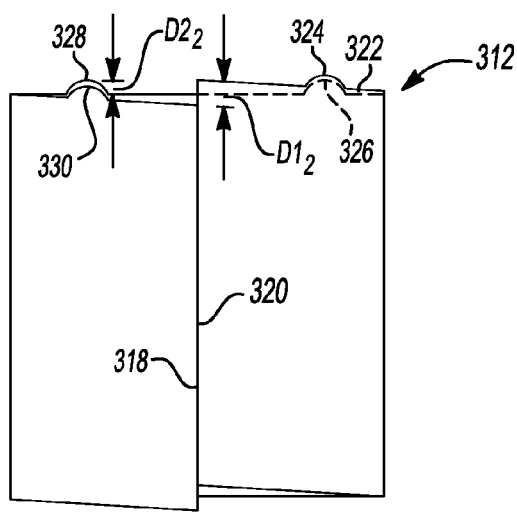
FIG. 7 is a schematic side plan view of an alternate shell according to the present disclosure.
Figure 8:
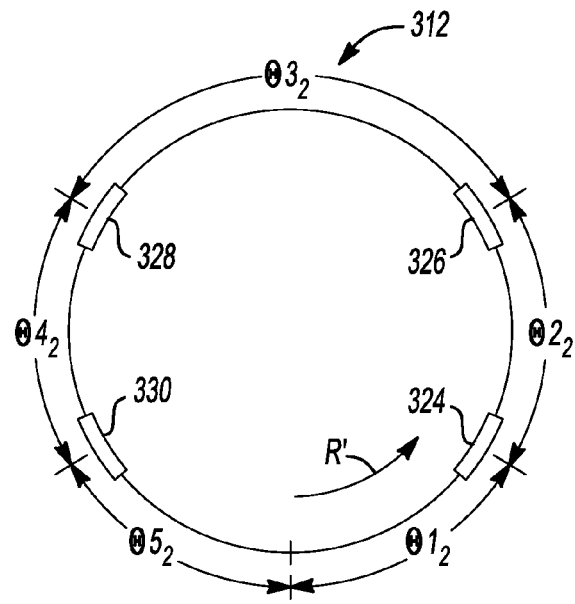
FIG. 8 is a schematic top plan view of the shell of FIG. 7.
Figure 9:
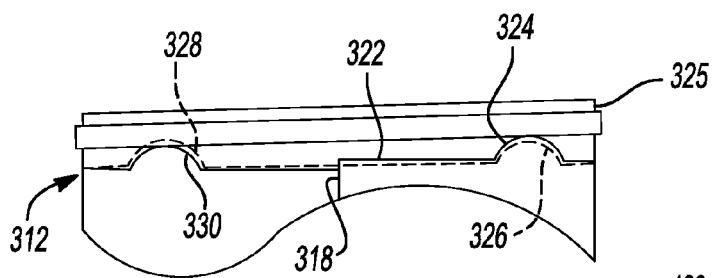
FIG. 9 is a schematic plan view of the shell of FIG. 7 and a partition.

With reference to FIG. 7-9, an alternate shell 312 is shown. Shell 312 may be similar to shell 12 with the exception of protrusions 224, 226, 228. Shell 312 may include a fourth protrusion 330. Third and fourth ends 318, 320 may be spaced apart a distance (X') generally similar to distance (X). As seen in FIG. 8, first protrusion 324 may be rotationally spaced by a first angle ($\theta1_2$) from third end 318 between 30 and 60 degrees in a rotational direction (R'). Accordingly, first protrusion 324 may be spaced a distance of between 1/12 and 1/6 of distance (X') from third end 318. Second protrusion 326 may be rotationally spaced by a second angle ($\theta2_2$) from first protrusion 324. Second protrusion 326 may be rotationally spaced from third end 318 by an angle ($\theta1_2+\theta2_2$) between 90 and 180 degrees in rotational direction (R'). Accordingly, second protrusion 326 may be spaced a distance of between 1/4 and 1/2 of distance (X') from third end 318.

Third protrusion 328 may be rotationally spaced from second protrusion 326 by a third angle ($\theta3_2$). Third protrusion 328 may be rotationally spaced from third end 318 by an angle ($\theta1_2+\theta2_2+\theta3_2$) between 180 and 270 degrees in rotational direction (R'). Accordingly, third protrusion 328 may be spaced a distance of between 1/2 and 3/4 of distance (X') from third end 318. Fourth protrusion 330 may be rotationally spaced from third protrusion 328 by a fourth angle ($\theta4_2$). Fourth protrusion 330 may be rotationally spaced from third end 318 by an angle ($\theta1_2+\theta2_2+\theta3_2+\theta4_2$) between 270 and 330 degrees in rotational direction (R'). Accordingly, fourth protrusion 330 may be spaced a distance of between 3/4 and 11/12 of distance (X') from third end 318. First protrusion 324 may be rotationally spaced from fourth protrusion 330 by an angle ($\theta1_2+\theta5_2$) between 60 and 120 degrees in rotational direction (R').

First, second, third, and fourth protrusions 324, 326, 328, 330 may each extend a longitudinal distance ($D2_2$) generally outwardly relative to edge 322. Distance ($D2_2$) may be greater than the longitudinal extent ($D1_2$) of third end 318 longitudinally outwardly from edge 322, as discussed above regarding first and second distances (D1, D2). A partition 325 generally similar to partition 26 may abut shell 312 for location relative thereto. More specifically, partition 325 may abut at least three of first, second, third, and fourth protrusions 324, 326, 328, 330. Partition 325 may abut first, second, third and fourth protrusions 324, 326, 328, 330 when first, second, third, and fourth protrusions 324, 326, 328, 330 are co-planar.

Figure 10:
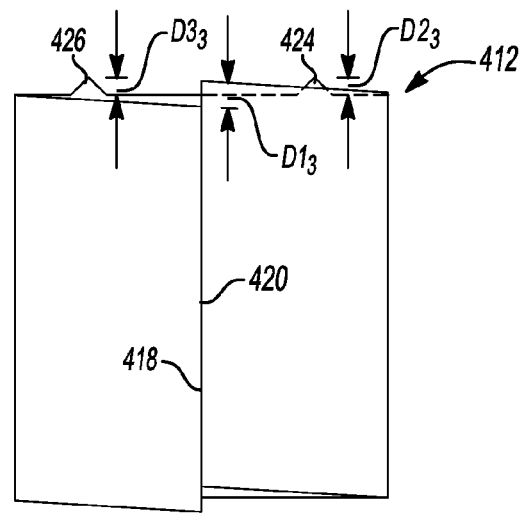
FIG. 10 is a schematic side plan view of an alternate shell according to the present disclosure.
Figure 11:
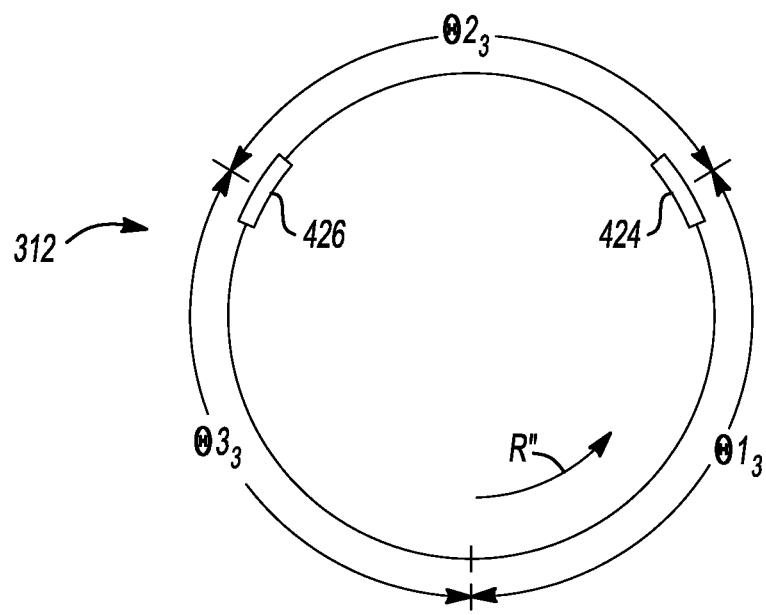
FIG. 11 is a schematic top plan view of the shell of FIG. 10.
Figure 12:
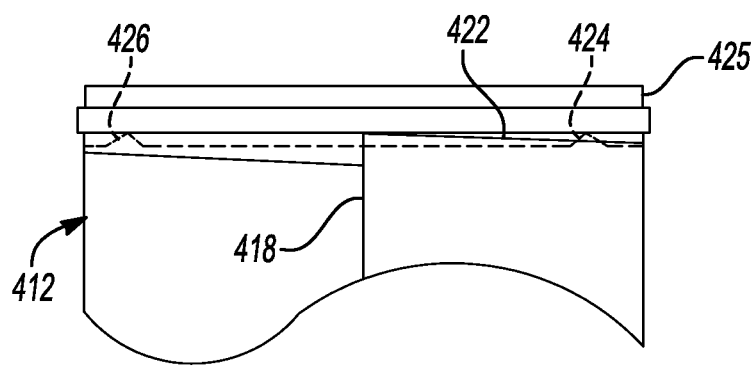
FIG. 12 is a schematic plan view of the shell of FIG. 10 and a partition.

With reference to FIGS. 10-12, an alternate shell 412 is shown. Shell 412 may be similar to shell 12 with the exception of protrusions 224, 226, 228. Third and fourth ends 418, 420 may be spaced apart a distance (X'') generally similar to distance (X). Shell 412 may include first and second protrusions 424, 426 rather than the three protrusions 224, 226, 228 of shell 12. First protrusion 424 may be rotationally spaced by a first angle ($\theta1_3$) from third end 418 between 90 and 150 degrees in a rotational direction (R''). Accordingly, first protrusion 424 may be spaced a distance of between 1/4 and 5/12 of distance (X'') from third end 418. Second protrusion 426 may be rotationally spaced by a second angle ($\theta1_3+\theta2_3$) from third end 418 between 210 and 270 degrees in rotational direction (R''). Accordingly, second protrusion 426 may be spaced a distance of between 7/12 and 3/4 of distance (X'') from third end 418.

First protrusion 424 may extend a longitudinal distance ($D2_3$) generally outwardly relative to edge 422 and second protrusion 426 may extend a longitudinal distance ($D3_3$) generally outwardly relative to edge 422. Distances ($D2_3$, $D3_3$) may be greater than the longitudinal extent ($D1_3$) of third end 418 longitudinally outwardly from edge 422, as discussed above regarding first and second distances ($D1_1$, $D2_1$). Alternatively, distances ($D2_3$, $D3_3$) may be a function of distance ($D1_3$) and the angular disposition ($\theta1_3$, $\theta2_3$) of protrusion 424. For example, distance ($D2_3$) may be generally defined by: $D2_3=(1-\theta1_3/360)*D$ and $D3_3=(1-(\theta1_3+\theta2_3)/360)*D$, where D is a function of $D1_3$. D may be defined as a maximum, a minimum, or an average of a range of values for $D1_3$ experienced during assembly of shell 412.

A partition 425 generally similar to partition 26 may abut shell 412 for location relative thereto. Partition 425 may abut first and second protrusions 424, 426 and a corner of shell 412 where edge 422 and third end 418 meet.

While partition 26 is illustrated in cooperation with end cap 24 to form discharge chamber 30 in FIG. 1, it is understood that a member similar to partitions 26, 325, 425 may alternately form an end cap to form a direct discharge compressor. The description of locating partition 26, 325, 425 relative to shell 12, 312, 412 and thrust bearing surface 74 of main bearing housing 16 applies equally to a direct discharge compressor configuration.

Further, it is understood that the height and location of protrusions 224, 226, 228, 324, 326, 328, 330, 424, 426 may be adjusted to optimize an orientation of partition 26, 325, 425 relative to shell 12, 312, 412 and main bearing housing 16. Additionally, it is understood that any of protrusions 224, 226, 228, 324, 326, 328, 330, 424, 426 may have a generally rectangular, rounded, triangular, or any other applicable shape.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
    forming a sheet of material having first, second, third, and fourth ends, the third and fourth ends extending longitudinally between the first and second ends;
    forming first and second protrusions at the first end, the first and second protrusions extending longitudinally outwardly from an edge of the first end; and
    coupling the third and fourth ends to one another to create a longitudinally extending compressor shell having a stepped region at the edge of the first end where the third and fourth ends meet.

2. The method of claim 1, wherein said forming the first protrusion includes forming the first protrusion to have a longitudinal extent that is greater than a longitudinal extent of the stepped region.

3. The method of claim 1, wherein said forming the first protrusion includes forming first and second recesses at the first end to create the edge at the first end having the first protrusion extending therefrom.

4. The method of claim 1, further comprising rolling the sheet of material to form a generally cylindrical compressor shell.

5. The method of claim 1, wherein said coupling includes welding the third and fourth ends to one another.

6. The method of claim 1, further comprising locating a partition plate on the first protrusion and fixing the partition plate to the compressor shell.

7. The method of claim 1, wherein said forming the first protrusion includes forming the first protrusion at a location spaced a distance from the third end between $1/12$ and $1/2$ the distance between the third and fourth ends.

8. The method of claim 7, wherein said forming the second protrusion includes forming the second protrusion at a location spaced a distance from the third end between $1/2$ and $11/12$ the distance between the third and fourth ends.

9. The method of claim 1, further comprising forming a third protrusion extending longitudinally outwardly from the edge of the first end.

10. The method of claim 9, wherein said forming the third protrusion includes forming the third protrusion at a location between the first and second protrusions.

11. The method of claim 9, further comprising forming a fourth protrusion extending longitudinally outwardly from the edge of the first end.

12. The method of claim 1, further comprising locating a bearing housing within the compressor shell and locating a partition plate on the first and second protrusions and fixing the partition plate to the compressor shell, the first and second protrusions locating the partition plate longitudinally relative to the bearing housing.

13. The method of claim 12, wherein locating the partition plate on the first and second protrusions mitigates an angular disposition of the partition plate relative to a thrust surface of the bearing housing.

14. A method comprising:
    securing a bearing housing within a longitudinally extending compressor shell, the compressor shell being formed from a sheet of material having first, second, third, and fourth ends, the third and fourth ends coupled to one another and extending longitudinally between the first and second ends, the first end including first and second protrusions extending longitudinally outwardly from an edge of the first end, and a stepped region being formed at the edge of the first end where the third and fourth ends meet;
    locating a partition plate on the first and second protrusions to locate the partition plate longitudinally relative to the bearing housing; and
    fixing the partition plate to the compressor shell.

15. The method of claim 14, wherein locating the partition plate on the first and second protrusions mitigates an angular disposition of the partition plate relative to a thrust surface of the bearing housing.

16. The method of claim 14, wherein the first protrusion is spaced a distance from the third end in a first direction along the edge between $1/12$ and $1/2$ the distance between the third and fourth ends.

17. The method of claim 16, wherein the second protrusion is spaced a distance from the third end in the first direction along the edge between $1/2$ and $11/12$ the distance between the third and fourth ends.

18. The method of claim 14, wherein the compressor shell includes a third protrusion extending longitudinally outwardly from the edge of the first end and locating the partition plate includes the partition plate being located on the third protrusion.

19. The method of claim 18, wherein the third protrusion is located between the first and second protrusions.

20. The method of claim 18, wherein the compressor shell includes a fourth protrusion extending longitudinally outwardly from the edge of the first end and locating the partition plate includes the partition plate being located on the fourth protrusion.

* * * * *